No. 790,637. PATENTED MAY 23, 1905.
W. E. JONES.
GATE LATCH.
APPLICATION FILED APR. 20, 1904.

Witnesses
E. F. Stewart
C. N. Woodward

William E. Jones, Inventor.
by C. A. Snow & Co
Attorneys

No. 790,637. Patented May 23, 1905.

UNITED STATES PATENT OFFICE.

WILLIAM ERVIN JONES, OF ELLISVILLE, MISSISSIPPI.

GATE-LATCH.

SPECIFICATION forming part of Letters Patent No. 790,637, dated May 23, 1905.

Application filed April 20, 1904. Serial No. 204,118.

*To all whom it may concern:*

Be it known that I, WILLIAM ERVIN JONES, a citizen of the United States, residing at Ellisville, in the county of Jones and State of Mississippi, have invented a new and useful Gate-Latch, of which the following is a specification.

This invention relates to gate-latches, and has for its object to simplify and improve the construction and produce an inexpensive and efficient device of this character which may be applied to any form of swinging gate and will effectually and automatically lock the same when the gate is closed.

With these and other objects in view, which will appear as the nature of the invention is better understood, the same consists in certain novel features of construction, as hereafter more fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages, and the right is therefore reserved of making all the changes and modifications which fairly fall within the scope of the invention and the claims made therefor.

Figure 1:
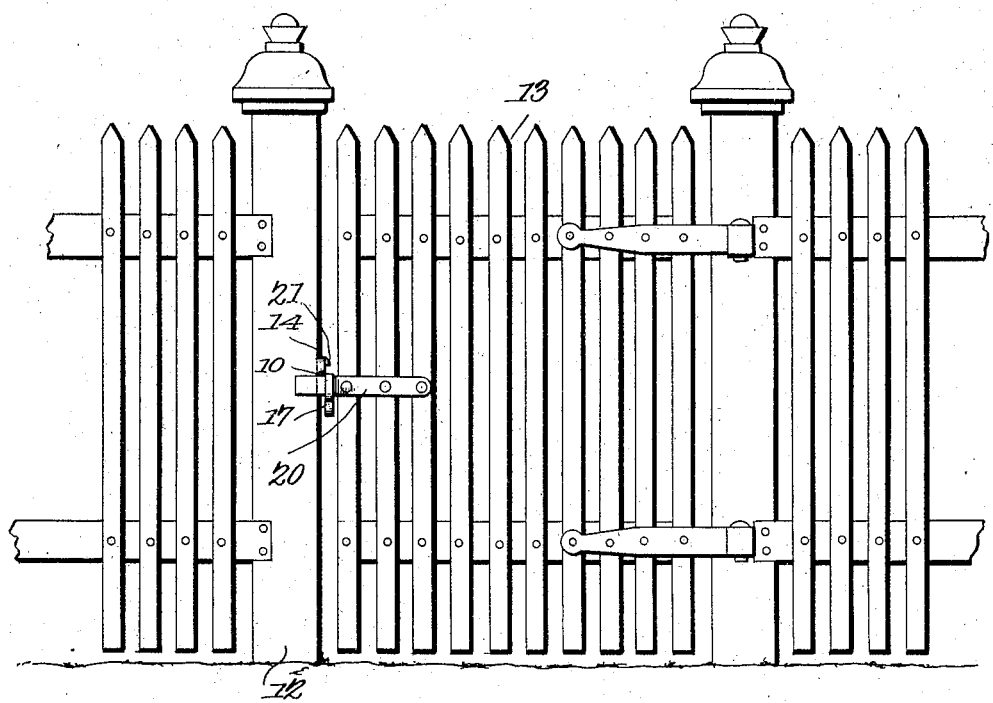
Figure 2:
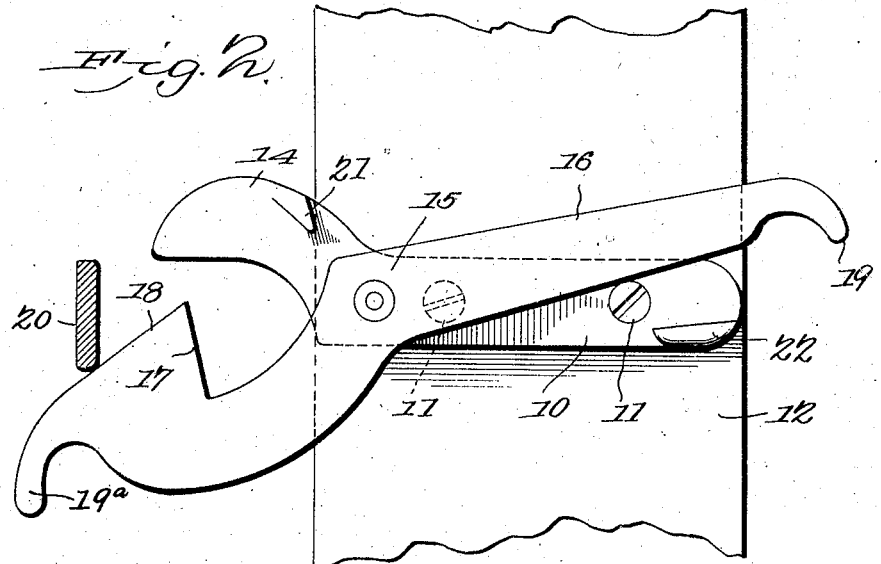

In the drawings thus employed, Figure 1 is a view of a gate and portions of the adjacent fence with the improved latch applied. Fig. 2 is an enlarged side elevation of the latch with the lock-bar in section.

The improved device comprises a stationary base member 10 for rigid attachment, as by screw 11, to the post 12, against which the moving end of the gate 13 swings, the free end of the member 10 extending in advance of the post and curving upwardly and outwardly, as at 14.

Pivoted at 15 to the base member 10 is a movable member 16, having at one end a hook 17, extending upwardly toward the curved portion 14 and terminating beneath it and inclined, as at 18, in advance of the hook. The ends of the member 16 terminate in finger-grips 19 and $19^a$.

A bar 20 is provided for attachment to the gate 13 and protruding therefrom to engage the inclined portion 18 of the member 16 to depress the same and pass behind the hook 17 as the gate is closed. The action is thus wholly automatic, as the gate closes by gravity or is forcibly actuated, the two portions 14 and 18 coacting to engage the member 20 as the gate is closed and effectually retain it between them until released by depressing the hook by elevating the rear end of the member 16 by operating one of the finger-grips 19 $19^a$.

Spaced stops 21 22 are disposed upon the member 10 to limit the movement of the member 16 in both directions and prevent it from being overbalanced in either direction.

The parts will preferably be of malleable iron or steel and of a size to withstand the strains to which they will be subjected.

Having thus described my invention, what I claim is—

In a device of the class described, a stationary member adapted for attachment to a gate-post, said member having an upwardly and outwardly curved engaging end and laterally-extending stops, and a latch member pivotally connected with said stationary member, between the stops, and having terminal finger-pieces and an intermediate hook adapted for coaction with the engaging end of the stationary member, said hook having a sloping upper edge and an abrupt engaging shoulder, in combination with a latch-bar rigidly attached to said gate adapted to engage the hooked end of the pivoted member to tilt the latter.

In testimony that I claim the foregoing as my own I have hereto affixed my signature in the presence of two witnesses.

WILLIAM ERVIN JONES.

Witnesses:
W. H. BUFKIN,
R. L. GARICH.